United States Patent
Kato

(10) Patent No.: US 8,203,759 B2
(45) Date of Patent: Jun. 19, 2012

(54) COLOR PROCESSING APPARATUS AND METHOD THEREOF

(75) Inventor: Minako Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 12/203,375

(22) Filed: Sep. 3, 2008

(65) Prior Publication Data

US 2009/0086242 A1 Apr. 2, 2009

(30) Foreign Application Priority Data

Sep. 27, 2007 (JP) ................................. 2007-252376

(51) Int. Cl.
*H04N 1/40* (2006.01)

(52) U.S. Cl. ........................................ 358/2.1; 358/504

(58) Field of Classification Search ................... 358/1.9, 358/2.1, 500, 504, 516, 518–520, 523, 530, 358/400, 406, 468
See application file for complete search history.

(56) References Cited

U.S. PATENT DOCUMENTS 5,355,234 A * 10/1994 Kim .............................. 358/512
7,058,232 B1 6/2006 Miyake
2002/0118381 A1 8/2002 Shirai et al.

FOREIGN PATENT DOCUMENTS

| JP | 2001-148778 | | 5/2001 |
|---|---|---|---|
| JP | 2002-278533 | | 9/2002 |
| JP | 2002-300416 | | 10/2002 |
| JP | 2003-338941 | | 11/2003 |
| JP | 2005-123790 | A | 5/2005 |
| JP | 2005-144875 | A | 6/2005 |
| WO | WO 2010031110 | A1 * | 3/2010 |

OTHER PUBLICATIONS

The above references were cited in a Mar. 2, 2012 Japanese Office Action, a copy of which is enclosed without an English Translation, that issued in Japanese Patent Application No. 2007-252376.

* cited by examiner

*Primary Examiner* — Thomas D Lee
*Assistant Examiner* — Stephen M Brinich
(74) *Attorney, Agent, or Firm* — Cowan, Liebowitz & Latman, P.C.

(57) ABSTRACT

The quality of an image read from a degraded image of an original document can be improved. Hence, a specific pixel of an image is selected, and additional information to be added to the image is generated from the position information and color information of the selected pixel. The image of an original document is read, position information and color information added to the original document are extracted, and the color information of a pixel corresponding to the position information is acquired from the read image. The color of the read image is corrected based on the extracted color information and the acquired color information.

5 Claims, 11 Drawing Sheets

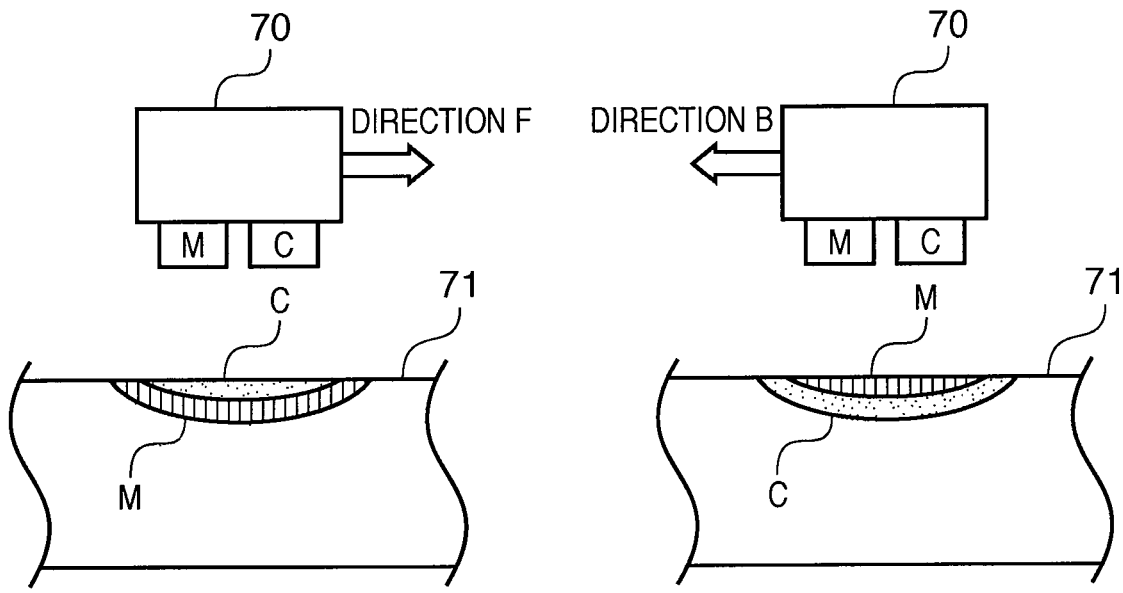
FIG. 1A
PRIOR ART
FIG. 1B
PRIOR ART
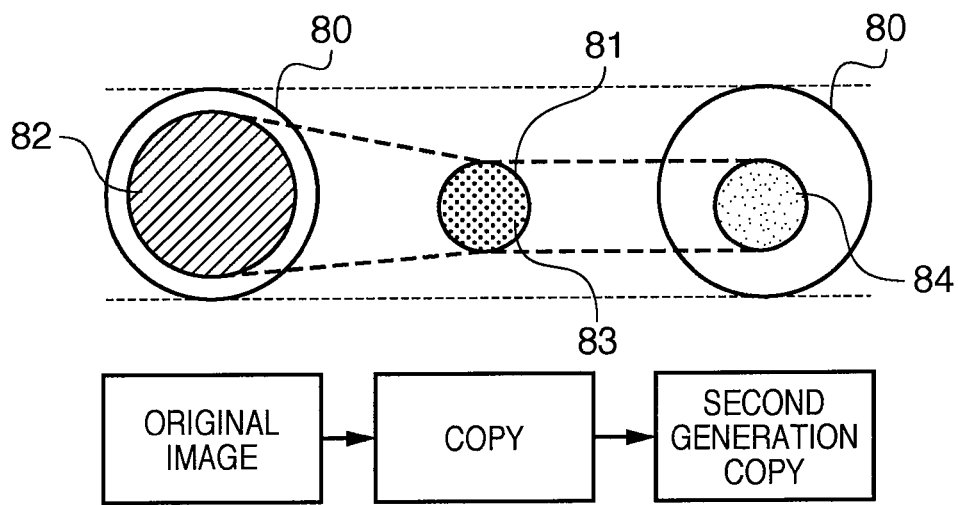
FIG. 2
PRIOR ART

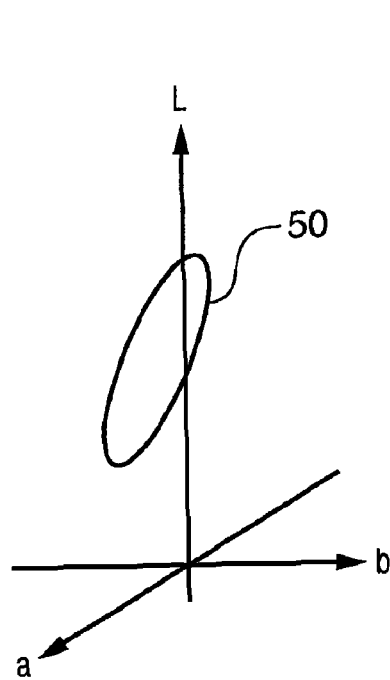
F I G. 11
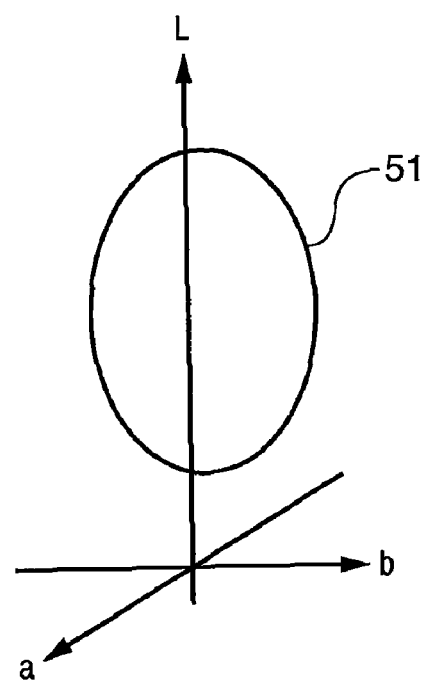
F I G. 12
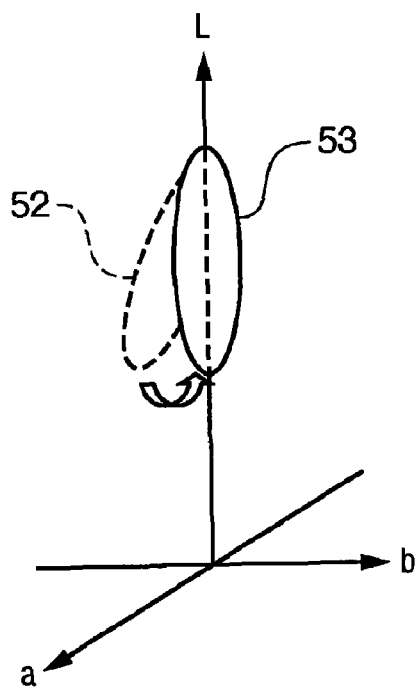
F I G. 13
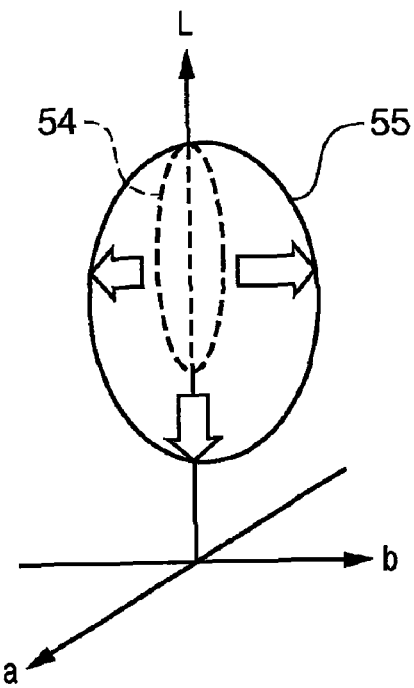
F I G. 14

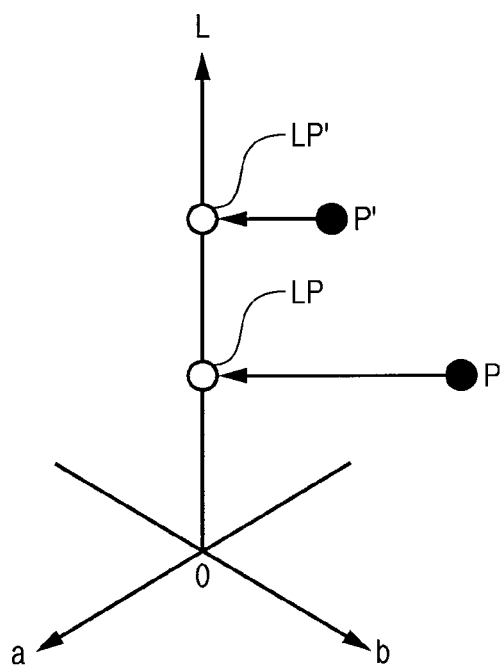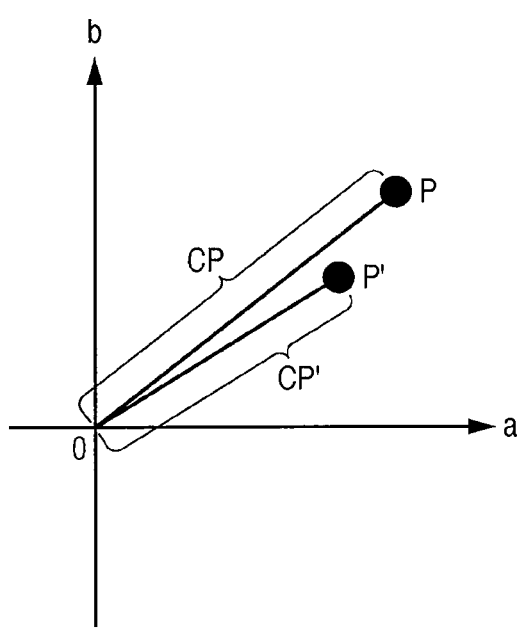
F I G. 15    F I G. 16

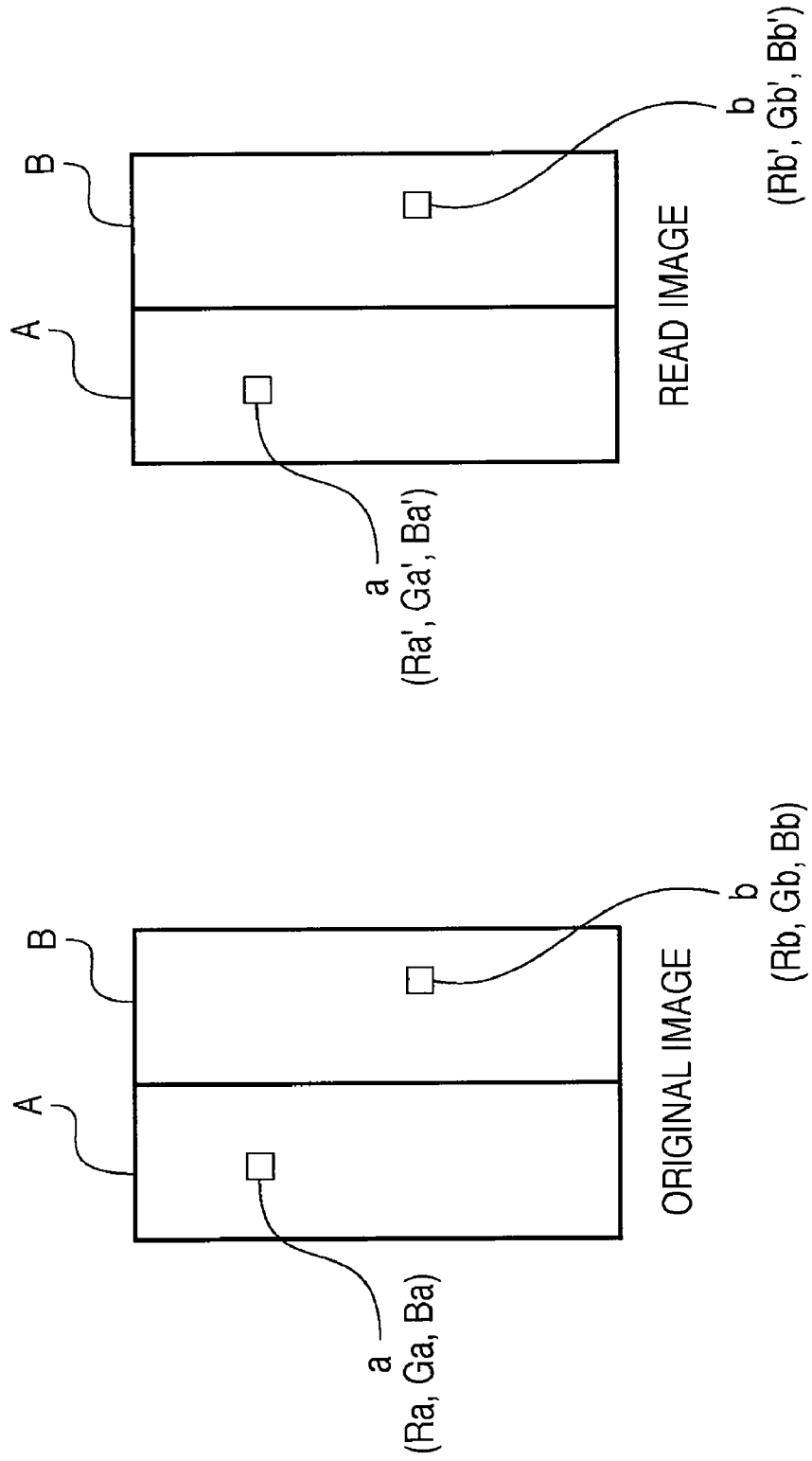

COLOR PROCESSING APPARATUS AND METHOD THEREOF

BACKGROUND OF THE INVENTION

1. Field of the Invention

The present invention relates to image processing for correcting an image read from an original document.

2. Description of the Related Art

[Fading Correction]

With improvement of performance, low cost, and simpler manipulation of a printer, scanner, and multi-functional peripheral equipment incorporating the functions of a printer and scanner, printing, scanning, copying, and the like have become easy. In addition, although documents and simple diagrams have been scanned, printed, or copied conventionally, photographs are also scanned, printed, or copied in these days. Since user's demand for the image quality of a photograph is high and the color reproducibility of print or copy is easy to recognize for users, color reproducibility is an important factor that determines image quality.

When an image of a silver halide film, photograph print, or printed material is exposed to light or air, it fades over time. In order to improve the resistance of a film, photograph print, or printed material, color materials and printing media have been improved. However, it is difficult to restore the colors of the image of an already faded film, photograph print, or printed material.

To solve this problem, a technique of acquiring the feature amount of an image or information for correction to perform fading correction of the image is available. For example, one technique (first technique) analyzes the density information of the image data of an original document, generates information (reproduction information) about an image reproduction condition, and adds it to the image data. When printing the image data with the reproduction information added thereto, the image data is corrected based on the reproduction condition to reproduce a color close to the image of the original document.

Another technique (second technique) reads an image of an original document and analyzes the read image to calculate image information. The calculated image information is printed outside an image formation area upon printing the read image. When the above-described image information is detected upon reading the image of the original document, the read image undergoes image processing based on that image information, and the processed image is printed.

According to these techniques, it is possible to correct an image read from a faded image of an original document to print an image close to the original color of the image of the original document.

[Problem about Color Reproduction]

The color of an image of an original document and the color of an image acquired by copying the image of the original document change due to differences in the color reproduction characteristics of devices.

In addition, there is also a problem such as metamerism in which color differences occur due to the difference between the RGB sensitivity of human vision and the RGB sensitivity of the sensor of a scanner. The color of an object recognized by a receptor such as an eye or sensor is determined according to the incident light, the reflection spectrum of the object, and the respective R, G, and B color sensitivities of the receptor. For this reason, even when the incident light and the reflection spectrum of an object remain the same, receptors with different sensitivities recognize different colors. Conversely, even when the incident light and the reflection spectrum of an object change, a receptor may recognize the same color depending on the distribution of its sensitivity.

For example, since a silver halide photograph print and a printed material of an inkjet print use different color materials and their image surface structures are also different, their reflection spectra are different. For this reason, colors perceived as the same color by the human vision are recognized as different colors by the sensor of a scanner having a sensitivity different from that of the vision.

In order to solve this problem, a technique of identifying the printing method of an image of an original document and modifying an image signal read from the image of the original document by using a color modification parameter corresponding to the identified printing method is available. This technique requires preparation of color modification parameters corresponding to various printing methods in advance. However, since the varieties of printing apparatuses and printing media continue to increase, it is difficult to generate color modification parameters for all of them.

[Problem of Color Correction]

The first and second techniques perform color correction using information which represents color balance, such as the RGB signal value and CMYK signal value of a solid color portion or skin color portion, the average value of luminances or color components, or the like of an image of an original image. In recent scanners and printers, however, satisfactory color correction cannot be done by the first and second techniques. The reason for this will be described next.

First, a color reproduced by a device does not always become the same color for the same RGB data. More specifically, in the case of a printer, a color gamut is determined according to a color material, printing medium, and the like, and therefore a color that falls outside the color gamut cannot be reproduced. For this reason, a printer compresses the color gamut of image data by performing gamut mapping. Compression of a color gamut differs depending on an intent for calorimetric matching, a high tonality level, or the like. As a result, even when the same RGB data as the original image is restored, the colors of the original image cannot always be reproduced due to the influences of a printer, print mode, color material, printing media, and the like.

Also, there is a problem notable in an inkjet printing method of a serial scan type in that a reproduced color changes depending of a printing method even when the amount of ink remains the same.

In an inkjet printing method of a serial scan type, an ink discharge unit discharges ink while reciprocating on a printing medium. During this operation, another operation (paper feed) to feed the printing medium in a direction perpendicular to the reciprocating movement of the ink discharge unit is also performed, so that ink can be eventually applied to the entire area of the printing medium. In such a method, the following problems arise.

First, a color printed in the forward movement of the ink discharge unit is sometimes different from that printed in the backward movement even when the amount of ink remains the same. For example, when printing blue, a cyan C ink and magenta M ink are used. In a forward movement shown in FIG. 1A in which an ink discharge unit 70 moves in a direction F, inks are discharged in the order of C to M at a single position on a printing medium 71. On the contrary, in a backward movement shown in FIG. 1B in which the ink discharge unit 70 moves in a direction B, inks are discharged in the order of M to C at a single position on the printing medium 71. In case of ink with a relatively high permeability that is often used by an inkjet printing apparatus, a phenomenon occurs in which an ink discharged at a later time gets under an ink discharged at an earlier time. As a result, the color of the ink discharged first becomes dominant. More specifically, when inks are discharged in the order of C to M, blue close to cyan appears, and when inks are discharged in the order of M to C, blue close to magenta appears. Accordingly, even when an amount of ink remains the same, different colors are reproduced in the forward and backward movements.

In addition, in an inkjet printing method, a phenomenon is known in which an ink droplet splits into a plurality of droplets upon one ink discharge. The plurality of split droplets reach a printing medium with a time difference, but their landing positions also shift along with the movement of the ink discharge unit 70. When the landing positions shift, the overlying manner of the inks on the printing medium also changes, so that an area factor changes and influences color reproduction as differences in density. In addition, a shift in the landing position in the forward movement and that in the landing position in the backward movement are different from each other in shift amount and position. Therefore, even when one kind of ink is discharged in the forward and backward movements, density or color may change due to the shift in the landing position.

Furthermore, the density or color changes due to the mechanical deviation of a paper feed mechanism or the driving mechanism of the ink discharge unit 70. More specifically, due to a mechanical deviation, landing positions on a printing medium vary, resulting in change in density or color. Particularly, the upper and lower end portions of a printing medium are known as positions where a landing position easily shifts since the printing medium cannot be sufficiently held.

As described above, in an inkjet printing method, even when ink of the same amount is discharged for a given pixel, the color of the pixel reproduced on a printing medium does not always become uniform due to influences such as the moving direction of the ink discharge unit 70, ink discharge status, mechanical deviation, and the like, and therefore each color changes depending on positions.

Against these problems, various countermeasures have been employed such as keeping a constant scan direction of an ink discharge unit, keeping a constant ink discharge order by preparing a plurality of ink discharge units, employing a multipath printing method in which an ink discharge unit scans a plurality of times on a printing medium, using a precision driving mechanism, and the like. However, these countermeasures lead to drop in printing speed or increase in cost, and it is difficult to balance it with improvement in image quality.

[Problem of Fading Correction]

Fading is a phenomenon that occurs when a color material is damaged by light, heat, oxygen in air, or the like. Some color materials are strong against damage, and other color materials are weak against damage. Accordingly, not all colors uniformly fade. For example, assume that a cyan ink has a high fading resistance and a magenta ink has a low fading resistance. In this case, even if they are balanced at the initial stage of printing, as fading advances, magenta becomes pale and cyan becomes a relatively dominant color.

When only color materials of cyan C, magenta M, and yellow Y are used, simple processing can be performed as color processing, which is expressed by:

$$C=255-R$$

$$M=255-G$$

$$Y=255-B \quad (1)$$

In this case, when the fading amount of each of C, M, and Y is known, it is relatively easy to reproduce the original color of an image from a signal value acquired by reading the faded image.

Nowadays, however, in order to improve image quality, use of black K or gray Gy, a homochromatic light color, colors with different hues (e.g., red R and green G) has become common in addition to basic C, M, and Y colors. As the number of ink types increases, the progression degree of fading is complicated.

In addition, in order to correct ink characteristics, not a simple method expressed by equation (1) but a complicated process using a matrix operation or lookup table (LUT) is employed for color conversion processing. In other words, a color separation process for determining a combination of ink amounts for RGB data is significantly complicated.

Accordingly, when conventional fading correction based on the average value of the three primary colors such as RGB or CMY or the average value of the color components over an entire image analyzed from a histogram is performed, correction is insufficient in some colors and excessive correction is performed in some colors. For example, assume that the image of an original document in which a magenta hue has faded little and a red hue has greatly faded is corrected based on the RGB average values or a histogram. In this case, when a correction amount is determined according to the red hue, an R component correction amount becomes large. However, since the magenta hue has faded little, when the R component correction amount according to the red hue is applied, excessive correction is performed in the magenta hue. Of course, when a correction amount is determined according to the magenta hue, correction in the red hue is insufficient.

As described above, it is difficult to correct differences in recognition of a color by a receptor and fading with a high performance by using information representing color balance such as the RGB signal values or CMYK signal values in a solid portion and skin color portion, the average value of luminances or color components, or the like of the image of an original document, information representing the type of an original document, and the like.

[Other Problems]

There are other cases in which it is preferable to correct the read image of an original document upon copying or scanning, in addition to a case of fading of the image of the original document. For example, when the color reproduction range of the original document is narrow or when color heterogeneity has occurred due to a problem of a printer used to print the original document, it is preferable to correct the read image of the original document.

An MFP adopting an inkjet printing method is compatible with various types of printing media such as a plain paper sheet or photograph printing sheet. The quality of a printed image greatly changes depending on a printing medium. That is, a color gamut reproducible by a printing medium is one of factors that determine the quality of a printed image. When a printing medium with a wide reproducible color gamut such as a photograph printing sheet is used, a vivid color can be vividly reproduced. On the other hand, when a printing medium with a narrow reproducible color gamut such as a plan paper sheet is used, a vivid color is inevitably reproduced as a color with a low saturation.

On the contrary, when an image with a narrow color gamut is printed on a printing medium with a wide reproducible color gamut, it can be discriminated that the color gamut of an image read from the printed image is narrow. However, it cannot be distinguished whether the narrow color gamut is due to the narrow color gamut of the original image or it becomes narrow when printing the image of the original document. Accordingly, the read image with the narrow color gamut will be printed without any correction.

FIG. 2 is a view schematically showing the color gamuts of images. For example, assume that an original image is a photograph printed on a photograph printing sheet, and a copy image acquired by copying the original image is printed on a plain paper sheet. In addition, assume that a second generation copy image acquired by copying the copy image is printed on a photograph printing sheet.

The photograph printing sheet can reproduce a wide color gamut 80. On the other hand, the plain paper sheet can reproduce a color gamut 81 narrower than the color gamut 80. When the original image has a wider color gamut 82 than the color gamut 81 of the plain paper sheet, gamut mapping is performed upon copying the image onto the plain paper sheet, and therefore the color gamut of the image is compressed into the color gamut 81 or a further narrower color gamut 83. That is, image conversion such as decreasing saturation or the like is performed by gamut mapping.

When the copy image of the plain paper sheet is copied onto the photograph printing sheet to produce a second generation copy image, since the color gamut of the copy image is the color gamut 83, the second generation copy image has a color gamut 84 similar to the color gamut 83. That is, although the photograph printing sheet capable of reproducing the color gamut 80 is used, its capability is not made full use, and the second generation copy image results in an image with a decreased saturation.

Also, color heterogeneity occurs due to the above-described mechanical deviation or the like in some printers upon printing an original image. Generally, when there is color heterogeneity, it is advantageous for a user to copy an image after correcting the color heterogeneity.

SUMMARY OF THE INVENTION

In one aspect, a color processing method comprises the steps of:

selecting a specific pixel of an image; and generating additional information to be added to the image from position information and color information of the selected pixel.

In another aspect, a color processing method comprises the steps of:

reading an image of an original document; extracting position information and color information added to the original document from the image read in the reading step; acquiring color information of a pixel corresponding to the position information in the image read in the reading step; and correcting a color of the image read in the reading step, based on the position information extracted in the extracting step and the color information acquired in the acquiring step.

According to these aspects, it becomes possible to improve the quality of an image read from a degraded original document image.

In another aspect, a color processing method comprises the steps of:

segmenting an image into a plurality of regions; extracting pixels having same values from the plurality of regions; and generating additional information to be added to the image from values and position information of the extracted pixels.

In another aspect, a color processing method comprises the steps of:

reading an image of an original document; extracting a value and position information of a pixel added to the original document from the image read in the reading step; acquiring a value of a pixel corresponding to the position information in the image read in the reading step; and correcting a color of the image read in the reading step, based on the value of the pixel extracted in the extracting step and the value of the pixel acquired in the acquiring step.

According to these aspects, it becomes possible to decrease color heterogeneity of an image read form an original document image.

In other words, irrespective of the type of an original document or the characteristics of a reading device, a faithful read image can be acquired.

Further features of the present invention will become apparent from the following description of exemplary embodiments with reference to the attached drawings.

BRIEF DESCRIPTION OF THE DRAWINGS

FIGS. 1A and 1B are views for explaining that a color printed in the forward movement of an ink discharge unit is different from that printed in the backward movement;

FIG. 2 is a view schematically showing the color gamuts of images;

FIG. 11 is a view illustrating the color gamut of (Ln',an', bn') acquired from a read image;

FIG. 12 is a view illustrating the color gamut of (Ln,an,bn) of position-color information;

FIG. 13 is a view illustrating a color gamut rotation process;

FIG. 14 is a view illustrating a process for correcting a saturation or black point;

FIGS. 15 and 16 are views for explaining the correction principle of the third embodiment;

FIGS. 19A and 19B are views showing an original image and a read image of a print image acquired by printing the original image, respectively, in each of which the image is segmented into regions and a selection point is set in each region.

DESCRIPTION OF THE EMBODIMENTS

Color processing of embodiments according to the present invention will now be described in detail with reference to the accompanying drawings.

The embodiments will exemplify a case in which a uniform color space CIEL*a*b* (1976) is employed as a calorimetric system. For the sake of simplicity, L*, a*, and b* are represented as L, a, and b, respectively. Note that a calorimetric system is not limited to CIEL*a*b*, but a known colorimetric system such as CIEL*u*v* or the like may be employed.

An original digital image is referred to as an "original image" or "original image data". The image of a printed material acquired by printing an image on a printing medium such as a paper or film sheet is referred to as a "print image". In relation to this, the image of a printed material acquired by printing an original image is referred to as an "original print image". In addition, an image acquired by reading a print image by a reading device is referred to as a "scanned image" or "scanned image data", and an image of a printed material acquired by printing a scanned image on a printing medium is referred to as a "copy image".

First Embodiment

MFP

Figure 3:
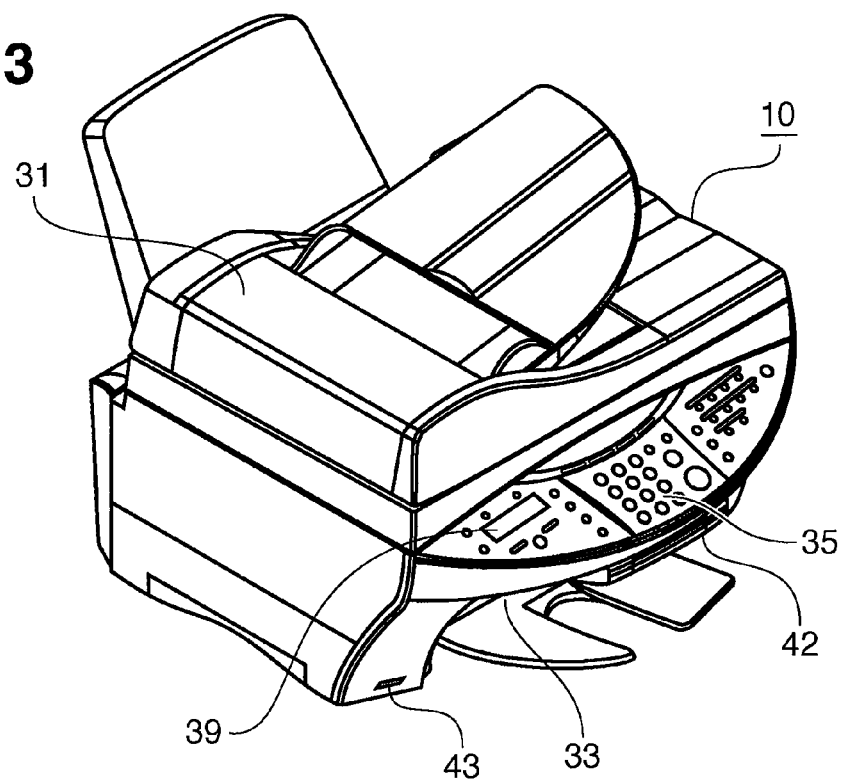
FIGS. 3 and 4 are views showing an outline of an MFP of embodiments.
Figure 4:
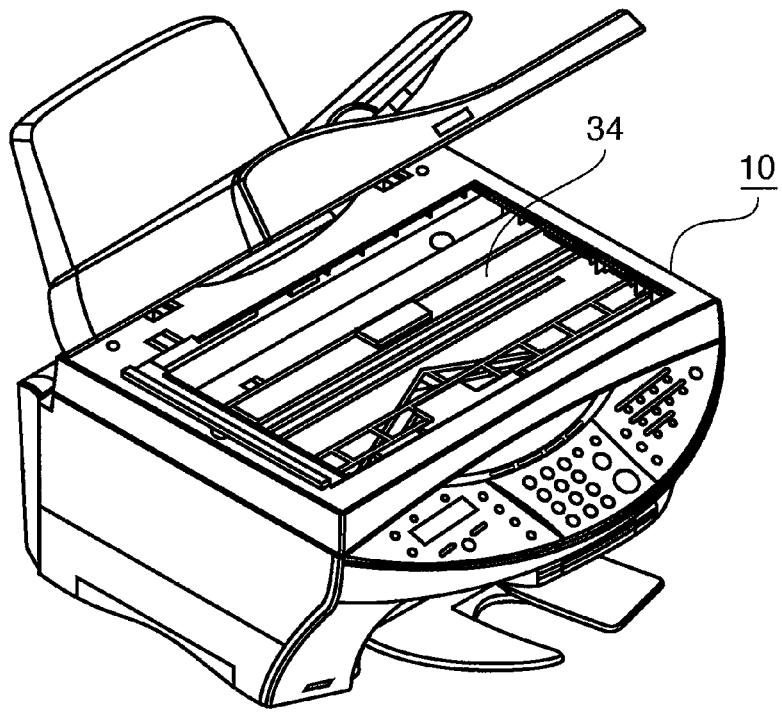

FIGS. 3 and 4 are views showing an outline of an MFP 10 of the first embodiment.

The MFP 10 has a function as a printer for printing data received from a host computer (to be referred to as a PC, hereinafter) and a function as a scanner for supplying a scanned image read from an original document to a PC. In addition, as a function of the MFP 10 alone, the MFP 10 includes a copy function of printing a scanned image read from an original document, a function of reading out image data from a storage medium such as a memory card and printing it, and a function of printing image data received from a digital camera.

The MFP 10 comprises a reading device 34 such as a flatbed scanner, a printing device 33 such as an inkjet or electrophotographic printing device, and an operation panel 35 which includes a display panel 39, various types of key switches, and the like. Also, there is a USB (Universal Serial Bus) port (not shown) for communicating with a PC on the back or the like of the MFP 10. Furthermore, the MFP 10 includes a card slot 42 for reading out data from a various types of memory cards, a camera port 43 for communicating data with a digital camera, an auto document feeder (ADF) 31, and the like.

Figure 5:
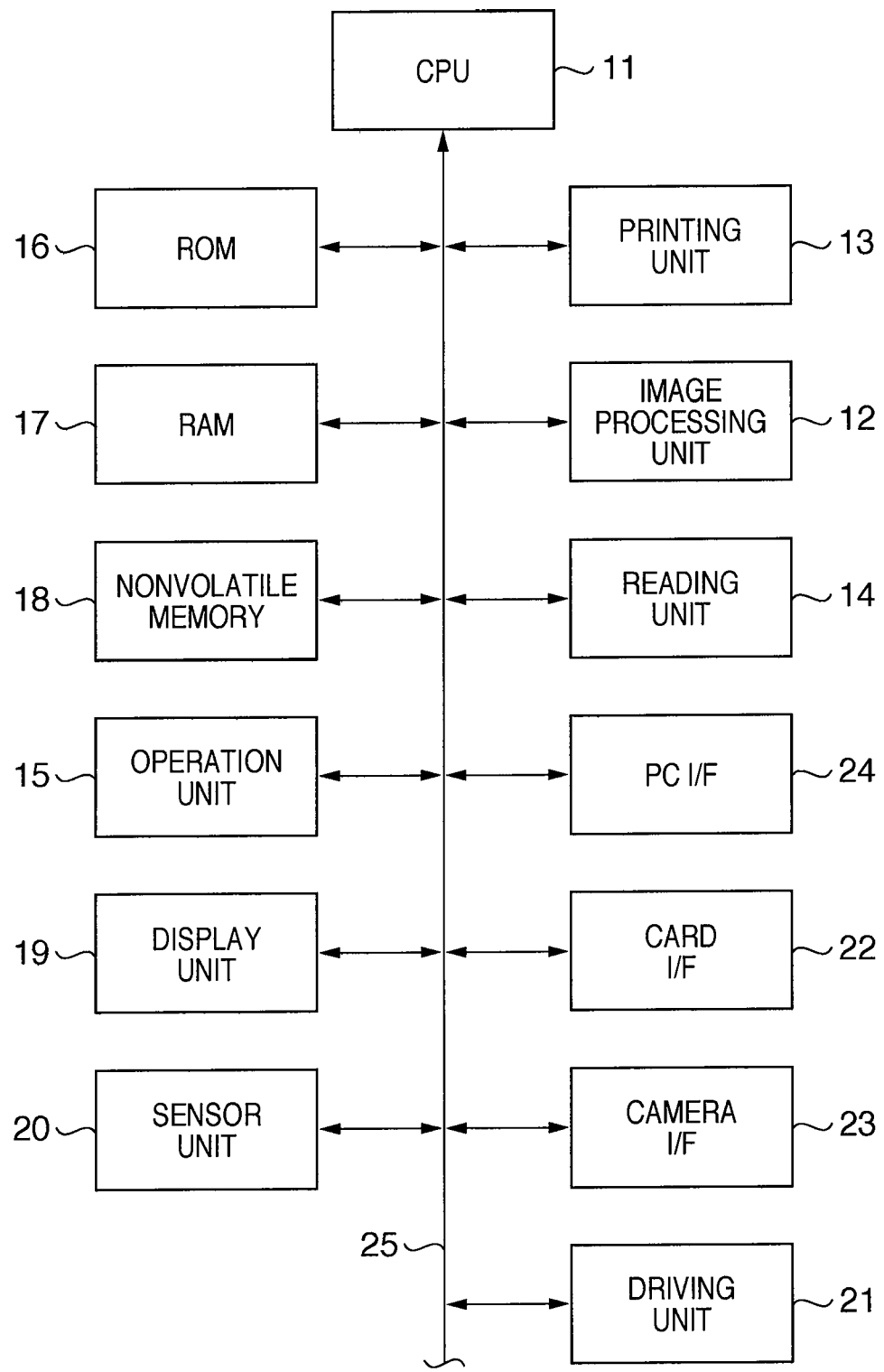
FIG. 5 is a block diagram showing an example of the functional arrangement of the MFP.

FIG. 5 is a block diagram showing the functional arrangement of the MFP.

A microprocessor (CPU) 11 uses a random-access memory (RAM) 17 as a work memory to control components to be described later via a system bus 25 in accordance with a control program stored in a read-only memory (ROM) 16 and user's operation input via an operation unit 15 corresponding to the operation panel 35. The CPU 11 implements an image processing unit 12 by executing an image processing program stored in the ROM 16.

A nonvolatile memory 18 is a battery backed-up static random-access memory (SRAM) or the like and stores data unique to the MFP 10.

The operation unit 15 comprises a photo direct print start key used to select an image stored in a memory card and start printing, a key used to give the instruction to print an order sheet, and a key used to give the instruction to read an order sheet. The operation unit 15 further comprises a copy start key in a monochrome copy mode or color copy mode, a mode key used to designate a print mode such as a copy resolution, image quality, and the like, a stop key used to stop a copy operation or the like, a ten-key pad used to input a copy count, a registration key, and the like. The CPU 11 detects the states (pressed or not) of these keys and controls respective components according to the detected states.

A display unit 19 corresponding to the display panel 39 comprises a liquid crystal panel (LCD) and an LCD driver, and makes various displays under the control of the CPU 11.

Also, the display unit 19 displays the thumbnail images of images recorded on a memory card mounted on a card interface (I/F) 22.

A reading unit 14 corresponding to the reading device 34, which includes a charge-coupled device (CCD), reads an image of an original document and outputs RGB luminance data under the control of the CPU 11. Note that a contact image sensor may be used in place of the CCD. When the ADF 31 is provided, it is possible to successively read a plurality of images of an original document.

The card I/F 22 corresponding to the card slot 42 reads an image captured by a digital still camera (a DSC, hereinafter) and recorded on a memory card or the like, under the control of the CPU 11. Note that the color space of image data read via the card I/F 22 is converted from the color space (e.g., YCbCr) of the DSC to a standard RGB color space (e.g., sRGB) by the image processing unit 12, if necessary. The read image data undergoes various types of processes required for applications to be described later, such as resolution conversion into the effective number of pixels and the like based on its header information.

A camera I/F 23 corresponding to the camera port 43 reads an image from a DSC by directly connecting it.

A PC I/F 24 is a general-purpose interface such as a USB for communicating data between a PC and the MFP 10. A PC issues a print instruction, scan instruction, and the like to the MFP 10 via the PC I/F 24 to transmit/receive data.

The image processing unit 12 applies to image data stored in the RAM 17 image processes such as image analysis, calculations of conversion characteristics, luminance-density conversion, scaling, gamma conversion, error diffusion, and the like (to be described later), under the control of the CPU 11. The image data (print data) that underwent the image processes is stored in a predetermined area of the RAM 17. When print data stored in the predetermined area of the RAM 17 reach a predetermined amount, the CPU 11 causes a printing unit 13 corresponding to the printing device 33 to execute an operation for printing an image represented by the image data.

The printing unit 13 corresponding to the printing device 33 comprises an inkjet head, application-specific integrated circuit (ASIC), and the like, and reads and prints out print data stored in the predetermined area of the RAM 17 under the control of the CPU 11.

A driving unit 21 includes stepping motors for driving feed and discharge rollers, gears for transmitting the driving forces of the stepping motors, a driver for controlling the stepping motors, and the like in the operations of the reading unit 14 and printing unit 13.

A sensor unit 20 includes a sensor for detecting the width of a printing sheet, a sensor for detecting the presence/absence of a printing medium, a sensor for detecting the width of an original document, a sensor for detecting the presence/absence of an original document, and the like. The CPU 11 detects the states of an original document and printing medium based on information acquired from the sensors of the sensor unit 20.

When the instruction for copying is given, the CPU 11 causes the image processing unit 12 to perform image processing of a scanned image read by the reading unit 14 and then causes the printing unit 13 to print the processed image.

[Creation of Original Print Image]

Figure 6:
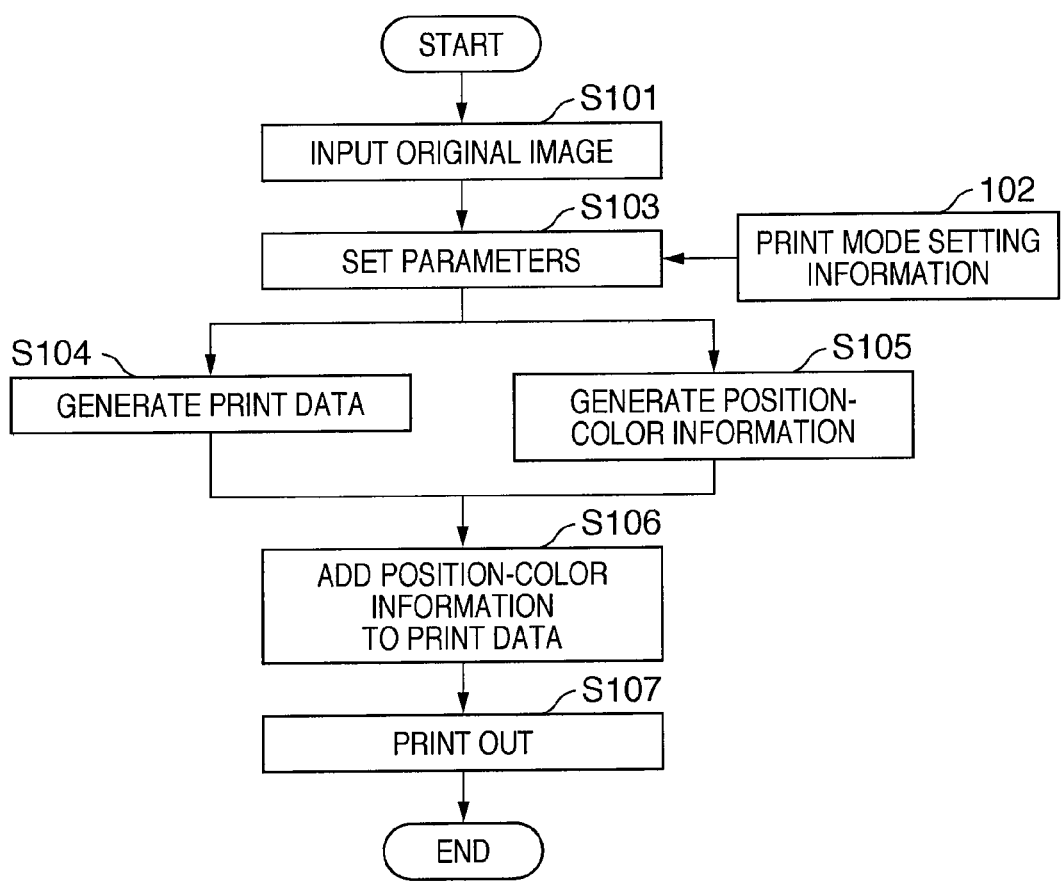
FIG. 6 is a flowchart for explaining an original print image creation process.

FIG. 6 is a flowchart for explaining an original print image creation process. In the original print image creation process, information (to be referred to as position-color information, hereinafter) required to reproduce the colors of an original image designated to be printed by a user is generated from the original image, and the original image with the position-color information added thereto is printed on a printing medium.

This embodiment will exemplify an original image as digital image data in which each of R, G, and B colors is represented by 8-bit data and the printing unit 13 as an inkjet printer provided with CMYK ink. Also, this embodiment will exemplify a case in which position-color information is superimposed on (added to) an original image as invisible information.

The CPU 11 inputs an original image (S101), and sets various types of parameters required for the process, based on print mode setting information 102 stored in the nonvolatile memory 18 that corresponds to a print mode set by the user via the operation unit 15 (S103). The parameters to be set include a print parameter used to generate print data for printing the original image, an extraction parameter used to extract position-color information, and the like. The print parameter generally differs in each type of a printing medium and each print mode. The extraction parameter generally differs in each type and characteristic of an original image.

Next, the CPU 11 controls the image processing unit 12 to generate print data based on the original image data and print parameter (S104). The CPU 11 also extracts position-color information by using the original image data and extraction parameter (S105). The CPU 11 then adds the position-color information to the print data by a process such as embedding the position-color information as a digital watermark (S106).

The CPU 11 then supplies the print data with the position-color information added thereto to the printing unit 13 to print a print image (S107). With this operation, an original print image with the position-color information added thereto can be created.

Generation of Print Data

Figure 7:
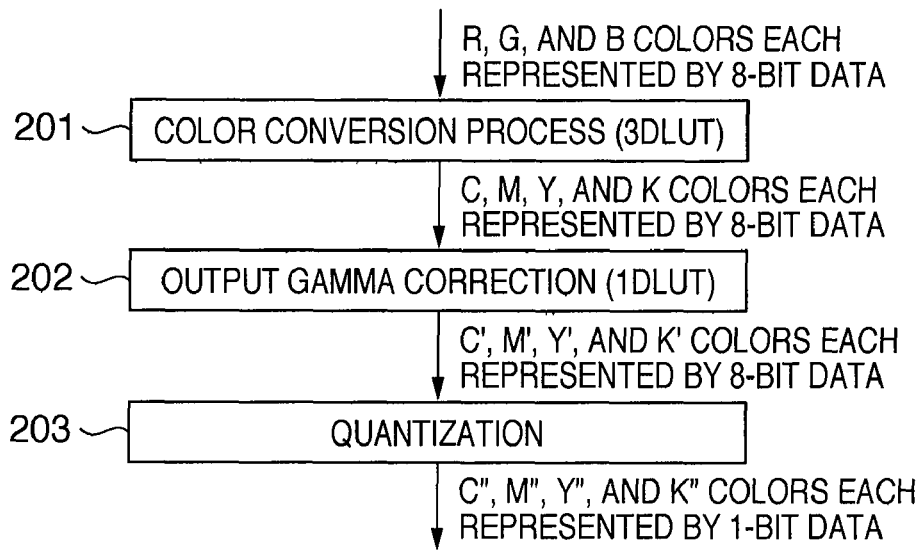
FIG. 7 is a flowchart for explaining a print data generation process by an image processing unit.

FIG. 7 is a flowchart for explaining a print data generation process (S104) by the image processing unit 12.

The image processing unit 12 performs a color conversion process 201 using a three dimensional (3D) LUT to color-separate data in which each of R, G, and B colors is represented by 8-bit data into data in which each of C, M, Y, and K colors is represented by 8-bit data, that correspond to the ink colors of the printing unit 13. The 3DLUT used in the color conversion process 201 holds discrete data, and the image processing unit 12 calculates output data by performing an interpolation process as needed.

Next, the image processing unit 12 performs an output gamma correction 202 using a one-dimensional (1D) LUT to perform gamma correction of the data in which each of C, M, Y, and K colors is represented by 8-bit data. Generally, the relationship between a print dot count per unit area and an output characteristic (reflection density or the like) is not a linear relationship. To solve this problem, the output gamma correction 202 is performed to ensure the linear relationship between the density level represented by the data in which each of C, M, Y, and K colors is represented by 8-bit data and its output characteristic (reflection density or the like).

The image processing unit 12 then performs quantization 203 to quantize the data (C'M'Y'K') in which each of C, M, Y, and K colors is represented by 8-bit data in accordance with the printing unit 13. For example, when the printing unit 13 is a binary printing device, the C'M'Y'K' data is binarized to data (C"M"Y"K") in which each color is represented by binary data.

Generation of Position-Color Information

Figure 8:
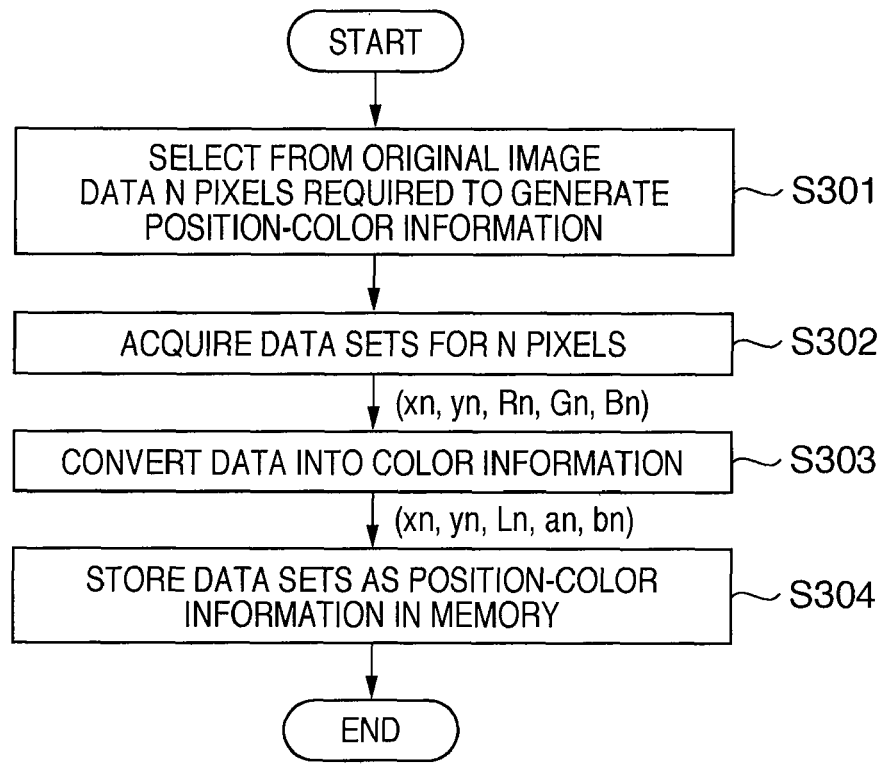
FIG. 8 is a flowchart for explaining a position-color information generation process by a CPU.

FIG. 8 is a flowchart for explaining a position-color information generation process (S105) by the CPU 11.

The CPU 11 analyzes the original image data and selects N pixels required to generate position-color information (S301). The CPU 11 then acquires the data sets (xn,yn,Rn,Gn,Bn) including the position data and RGB values of the selected N pixels (note that $1 \leq n \leq N$) (S302).

Next, the CPU 11 looks up a color conversion table stored in the ROM 16 that corresponds to the print mode setting information 102 to acquire (xn,yn,Ln,an,bn) in which the R, G, and B values of (xn,yn,Rn,Gn,Bn) are converted into color values (S303). Note that the color conversion table is a position-color information generation table used to convert RGB into Lab. The acquired data sets (xn,yn,Ln,an,bn) are stored in a predetermined area of the RAM 17 as position-color information (S304).

Relationship Between Print Parameter and Color Conversion Table for Generating Position-Color Information The 3DLUT used in the color conversion process 201 and the 1DLUT used in the output gamma correction 202 are print parameters that form a conversion table for converting the RGB value of an original image into an ink amount. Accordingly, different parameters are set according to a print mode distinguished by the type of ink, type of a printing medium, printing method, and the like. The print parameter is designed to reproduce a target color when applying a defined ink amount to a printing medium in a defined print mode. In other words, the print parameter is a guide for converting a particular RGB value into an ink amount for reproducing a particular Lab value (target value). On the other hand, an Lab value converted from an RGB value by using the color conversion table for generating position-color information in step S303 is the same color value as the above-described target value (Lab value).

Figure 9:
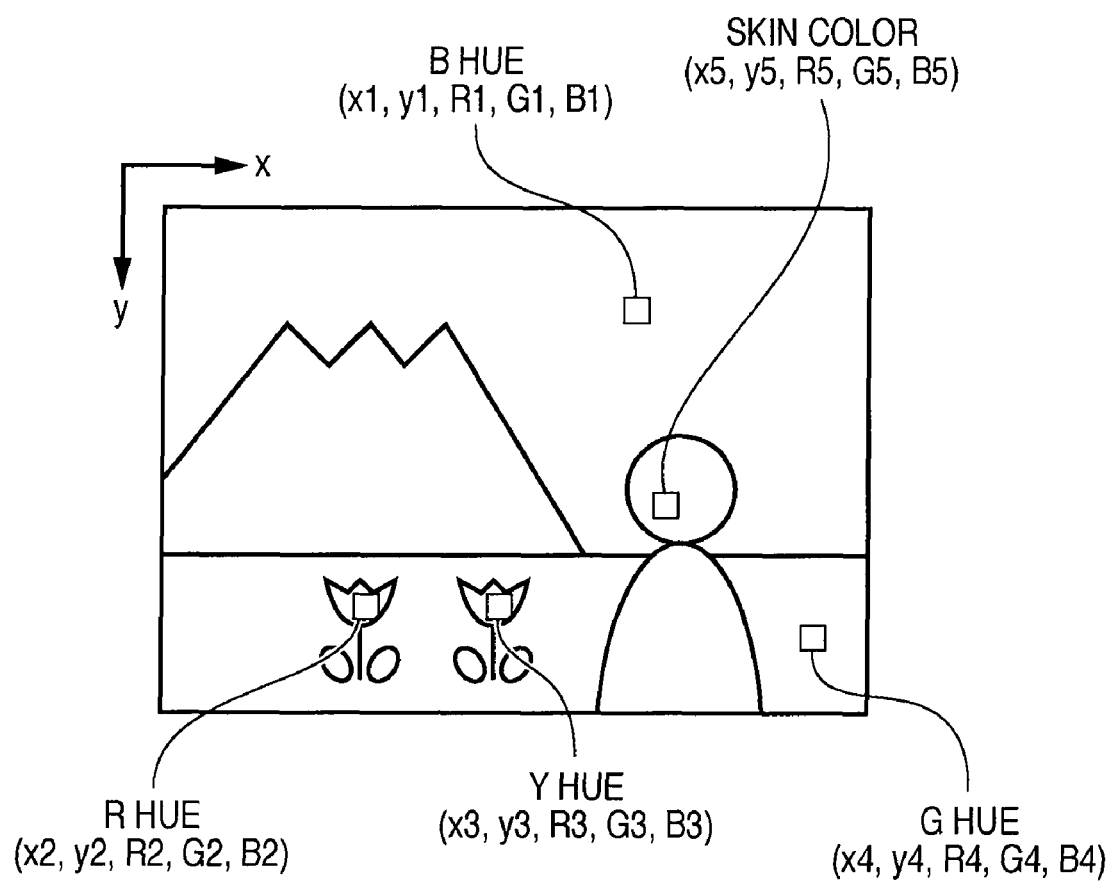
FIG. 9 is a view for explaining selection of pixels used to extract position-color information.

FIG. 9 is a view for explaining selection of pixels used to extract position-color information, which is an original image (e.g., RGB image data captured by a DSC) including a person and flowers with a sky, a mountain, and grasslands in the background.

A pixel (selection point 1) is selected from the image region of the sky of this original image and its position information and RGB value (x1,y1,R1,G1,B1) are acquired. Likewise, selection points 2 and 3 are selected from the image region of the flowers, selection point 4 is selected from the image region of the grasslands, selection point 5 is selected from the image region of the face of the person, and the position information and RGB values of the respective selection points are acquired. That is, (x2,y2,R2,G2,B2), (x3,y3,R3,G3,B3), (x4,y4,R4,G4,B4), and (x5,y5,R5,G5,B5) corresponding to selection points 2 to 5 are acquired.

The above-described selection points (five points) correspond to, for example, the representative points of the respective hues of red, green, blue, and yellow, and the skin color as a memory color. Preferably, selection points are selected from colors in the light and dark regions and a maximum saturation point of the respective hues of a primary color CMY and a secondary color RGB with good balance on the color space. More specifically, for example, in case of an R hue, selection points preferably have values (R,G,B)=(255,128,128), (255,0,0), (128,0,0) or values in the neighborhood or vicinity of these values. In addition, selection points preferably include a white point (255,255,255) and a black point (0,0,0) or values in the neighborhood or vicinity of these points. Particularly, when an important memory color such as a skin color is selected, the memory color which is important in determining image quality can be more accurately reproduced. Furthermore, selection points may be selected according to a data amount that can be added or an image type. According to an image type, for example, when an image is determined to be a portrait by a determination process or the like, a skin color is preferentially selected.

When there is a plurality of pixels with the same RGB values in an original image, selection of a pixel as position-color information is not particularly limited. More pixels may be extracted from the central portion of the image in which the above-described mechanical deviation is small, or a pixel may be selected from a region in which pixels having the same or almost the same RGB values continue in consideration of the deviation upon reading. Such a selection method is also set in advance.

[Original Print Image Reading Process]

Figure 10:
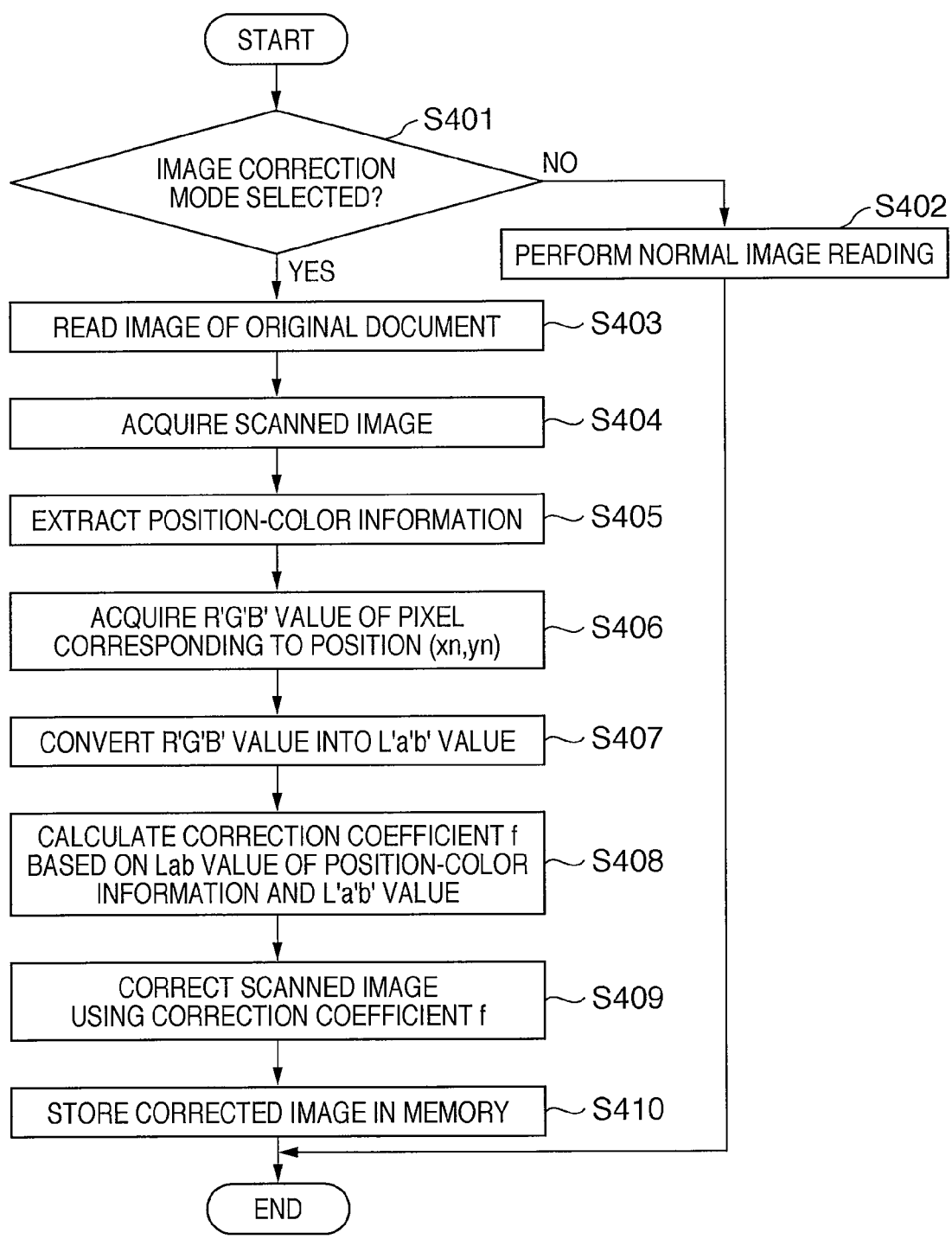
FIG. 10 is a flowchart for explaining an original print image reading process.

FIG. 10 is a flowchart for explaining an original print image reading process.

The CPU 11 first determines whether an image correction mode to perform image correction is selected or not (S401), and performs a normal image reading process when no image correction mode is selected (S402).

When the image correction mode is selected, the CPU 11 controls the reading unit 14 to scan the image of an original document (S403), and acquires a scanned image (S404). The CPU 11 extracts added position-color information (xn,yn,Ln,an,bn) of N pixels from the scanned image (S405).

Next, the CPU 11 extracts the RGB value (Rn',Gn',Bn') of a pixel corresponding to the pixel position (xn,yn) of the position-color information from the scanned image (S406). The CPU 11 then converts (Rn',Gn',Bn') into (Ln',an',bn') by using the scanner profile of the reading unit 14 (S407).

With the above-described process, a correspondence relationship described below can be acquired.

| Position | Read Color Value | Color Value of Original Image |
|---|---|---|
| x1, y1 | L1', a1', b1' | L1, a1, b1 |
| x2, y2 | L2', a2', b2' | L2, a2, b2 |
| . | . | . |
| . | . | . |
| . | . | . |
| xn, yn | Ln', an', bn' | Ln, an, bn |

When an original print image has faded, the color represented by the position-color information added to the original print image is different from the color of a pixel at the same position of the faded print image read by the reading unit 14.

Next, the CPU 11 calculates a correction coefficient f used to return the read color value to the color value of the original image, based on the above-described correspondence relationship (S408). The CPU 11 then corrects the scanned image using the correction coefficient f (S409), and stores the image after the correction (the corrected image, hereinafter) in a predetermined area of the RAM 17 (S410).

Note that a corrected image may be output to the printing unit 13, or may be displayed on a monitor via a PC. When a corrected image is output to the printing unit 13, a copy image in which colors of a faded print image are corrected can be acquired. When a corrected image is output to the printing unit 13, the processes shown in FIG. 7 are of course performed.

Calculation of Color Correction Coefficient f

FIG. 11 is a view illustrating a color gamut 50 of (Ln',an',bn') acquired from a read image (assumed to have faded), and FIG. 12 is a view illustrating a color gamut 51 of (Ln,an,bn) of position-color information.

The color gamut 50 of the faded image exhibits a phenomenon called "color cast", a saturation drop, or a shift of a black point in a lighter direction, as compared to the color gamut 51 of the original image.

The CPU 11 calculates the correction coefficient f for bringing (modifying) the color gamut 50 close to the color gamut 51. The correction coefficient f includes the following correction processes. FIG. 13 is a view illustrating a color gamut rotation process, in which a color gamut 52 represented by a broken line that underwent color cast to a color gamut 53 represented by a solid line. FIG. 14 is a view illustrating the process for correcting a saturation or black point, in which a color gamut 54 represented by a broken line, that underwent a saturation drop or shift of the black point in a lighter direction, is modified to a color gamut 55. In addition, a pinpoint conversion process using memory color data is also available. Note that the correction coefficient f is provided as a coefficient of a conversion formula, conversion table, matrix operation, or the like.

Addition of Information

In order to embed information in a printed material or to extract information embedded in a printed material, existing methods can be utilized. For example, a method disclosed in Japanese Patent Laid-Open No. 2001-148778 is as follows. An image is segmented into a plurality of image regions, and each image region is quantized by an error diffusion method. A quantization condition is controlled for each image region based on information to be added. When extracting information added to an image, the image is segmented into a plurality of image regions, and each image region undergoes orthogonal transformation. Based on an orthogonal transformation coefficient, the image regions are classified into a plurality of classes, and the added information is extracted based on the feature amount of each class.

A method of adding position-color information is not limited to a method of invisibly overlying (embedding) it in an original print image, but a method of adding visible information such as a bar code, two dimensional code, character, numerical character, or symbol to a region (outside an image region) such as the reverse side or margin of a printing medium of a print image. Alternatively, position-color information may be added by utilizing an IC chip, magnetic recording, or the like, but in that case, a reader to read the data of the IC chip or magnetic recording is utilized to acquire the position-color information.

The unit of "pixels" upon extracting position-color information is not limited. The unit of pixels in an original image may be the same as that upon extracting position-color information, or the number of pixels upon extracting position-color information may be set larger than that in an original image. When the resolution of position-color information is low, several pixels of the original image are set as a pixel unit, and the central position of the several pixels and an Lab value converted from the average value of the RGB values of those pixels can be set as position-color information.

The number of selection points used to extract position-color information is not limited. However, using the larger number of selection points enables correction with a higher accuracy. Note that at least three selection points are required to determine the correction coefficient f by a 3×3 matrix operation.

This embodiment has exemplified Lab as the type of position-color information, but the type of position-color information is not limited to this. Numerical values expressed in another coordinate system such as Luv may also be used. Furthermore, a device dependent signal value such as RGB can be used as position-color information as long as its color conversion profile is known. The color conversion profile can be a profile provided uniquely to a device, or may be a defined profile such as sRGB.

In this manner, based on position-color information added to an original print image, it is possible to correct, for example, a faded image to a color close to an original image before fading. Of course, an image with colors further closer to the original image can be acquired by correcting the characteristics of a device to read the image.

Second Embodiment

The color processing of the second embodiment according to the present invention will now be described. Note that the same components as in the first embodiment are denoted by the same reference numerals in the second embodiment, and a detailed description thereof will not be repeated.

The second embodiment will exemplify a case in which position-color information is extracted while considering print control information.

As described above, in case of an inkjet printer, a color or density changes depending on the overlying order of ink colors, the scan direction of a print head, and the like. To solve this problem, a color value is adjusted by using position-color information added to an original print image, that includes not only position information and a color value but also print control information indicating the type of print control to be performed at a corresponding position. With this arrangement, more accurate correction can be performed.

In step S103 shown in FIG. 6, various types of parameters are set based on print mode setting information 102. The parameters set in this step include print parameters used to generate print data for printing an original image, a conversion parameter for generating position-color information used to generate position-color information, and print control parameters. The print control parameters are determined according to a print mode, and include information about the paper-feed amount of a printing medium, reciprocation control of an ink discharge unit, the number of multiscanning, and the like.

Due to print control, there may be a plurality of Lab values for a single RGB value. For example, for a blue (R,G,B)=(0,0,255), there are a blue $(L,a,b)_1$ close to cyan acquired when printing in the order of C to M and a blue $(L,a,b)_2$ close to magenta acquired when printing in the order of M to C. $(L,a,b)_1$ and $(L,a,b)_2$ for the blue (R,G,B)=(0,0,255) are described in the color conversion parameter for generating position-color information. A CPU 11 determines a selection point in step S301 shown in FIG. 8. Once its pixel position (x,y) is determined, the CPU 11 looks up the print control parameters to analyze print control at that pixel position. In step S303, the CPU 11 distinguishes a most accurate color value from a plurality of Lab values determined from the RGB value of the pixel of interest, and determines position-color information (x,y,L,a,b).

Note that how a color reproduced by print control changes is determined based on the type or characteristics of ink used by the printing unit 13, those of a printing medium, the characteristics of the ink discharge unit, the mechanical characteristics such as paper feeding, and the like. Note that the above-described discrimination need not be performed for all RGB values. That is, when a color to be reproduced is hardly influenced by print control, the above-described discrimination is unnecessary. The above-described discrimination is performed for only a reproduced color which is greatly influenced by print control.

In this manner, in addition to the same effect as in the first embodiment, more appropriate correction can be performed by using position-color information considering the effect of print control. Accordingly, an image having colors further closer to an original image can be acquired.

Modification of Embodiments

The first and second embodiments have exemplified a method in which the RGB value of a pixel selected according to an extraction parameter upon extracting position-color information is converted into an Lab value by looking up an RGB to Lab conversion table corresponding to a print parameter. However, an RGB value acquired by calorimetrically measuring an original print image directly by using a spectral colorimeter or color measurement device or an RGB value read from an original print image by a scanner whose reading characteristics is known may be converted into an Lab value. That is, position-color information is generated by converting an RGB value into an Lab value before an original print image deteriorates by fading or the like.

Third Embodiment

The color processing of the third embodiment according to the present invention will now be described. Note that the same components as in the first and second embodiments are denoted by the same reference numerals in the third embodiment, and a detailed description thereof will not be repeated.

The first and second embodiments have exemplified a case in which a conversion coefficient f is calculated from the color values of a plurality of selection points. The third embodiment will describe a method of correcting an image by using a color value of one selection point. Note that in the third embodiment, an original print image is read, added position-color information (x,y,L,a,b) is acquired, and the color value (L',a',b') of a position (x,y) is acquired from the read image, as in the first embodiment.

FIGS. 15 and 16 are views for explaining the correction principle of the third embodiment.

As shown in FIG. 15, assume that an Lab coordinate point indicated by position-color information (x,y,L,a,b) is defined as point P, and that an Lab coordinate point indicated by the color value (L',a',b') of a position (x,y) in a read image is defined as point P'. Point P indicates a color at the time of printing an original print image, and point P' indicates a current color acquired by reading the original print image. Therefore, when a print image has deteriorated by fading or the like, P≠P'.

Points LP and LP' shown in FIG. 15 are points acquired by mapping points P and P' onto the lightness axis, respectively. Accordingly, points LP and P have the same lightness, and so do points LP' and P'. Therefore, an equation for correcting point LP' to point LP is expressed by:

$$LP = LP' \times LP/LP' \qquad (2)$$

That is, a coefficient for correcting a read image in the lightness direction can be set as LP/LP'.

FIG. 16 illustrates an ab plane that nearly includes points P and P'. Assuming that points P and P' shown in FIG. 16 have almost the same hue and letting CP and CP' be the distances from the origin to points P and P', respectively, an equation for correcting point P' to point P is expressed by:

$$P = P' \times CP/CP' \qquad (3)$$

That is, a coefficient for correcting a read image in the saturation direction can be set as CP/CP'.

More specifically, a correction coefficient is calculated from the relationship between the position-color information (x,y,L,a,b) of a given selection point and the color value (L',a',b') of the position (x,y) in a read image, by using:

$$f_L = L/L'$$

$$f_C = \sqrt{(a^2+b^2)}/\sqrt{(a'^2+b'^2)} \quad (4)$$

When the color value of each pixel of the read image is multiplied by correction coefficients $f_L$ and $f_C$, a corrected image can be acquired.

Fourth Embodiment

The color processing of the fourth embodiment according to the present invention will now be described. Note that the same components as in the first to third embodiments are denoted by the same reference numerals in the fourth embodiment, and a detailed description thereof will not be repeated.

The fourth embodiment will describe a method of correcting a scanned image by estimating a fading level from the types of ink and printing medium used when printing an original print image, in addition to position-color information and information of the scanned image.

Figure 17:
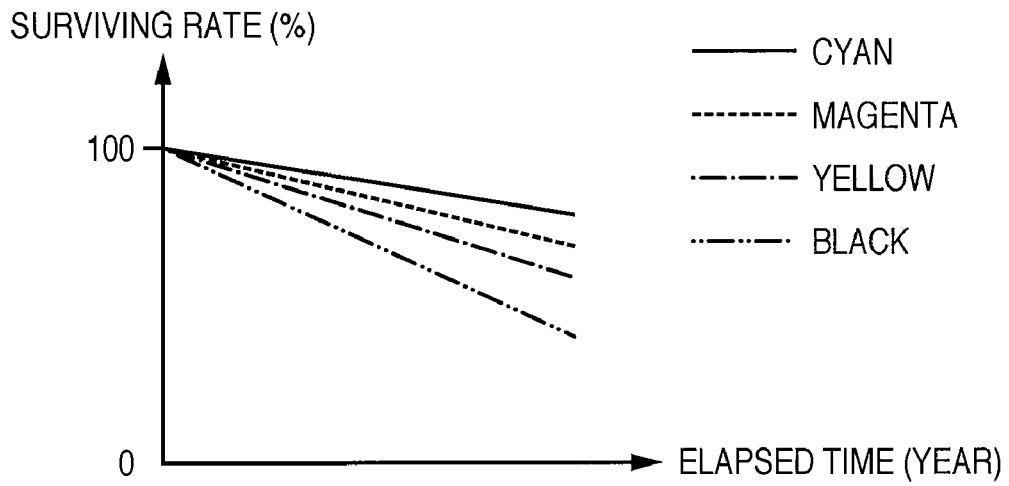
FIG. 17 is a graph showing an example of density aging information.

FIG. 17 is a graph showing an example of density aging information, which shows the surviving rate of density of each color of cyan, magenta, yellow, and black with respect to the elapsed time. The surviving rate of density is experimentally acquired for each combination of an ink color and printing medium. In addition, elapsed time correction amount information that represents the relationship between the elapsed time and the image correction amount is experimentally acquired in advance. Note that an original print image is read, added position-color information (x,y,L,a,b) is acquired, and the color value (L',a',b') of a position (x,y) is acquired from the read image, as in the first embodiment. Selection points preferably include pixels of cyan, magenta, yellow, and black, but the information of at least one color (to be referred to as a specific selection point, hereinafter) of these colors is required in this embodiment.

Based on the density variation between the position-color information (x,y,L,a,b) of a specific selection point and the color value (L',a',b') of the pixel at the position (x,y) of the read image, the time elapsed after the print image was printed can be estimated from the aging information shown in FIG. 17. Based on this elapsed time, the correction amount of the scanned image is determined from the elapsed time correction amount information.

Aging information and elapsed time correction amount information can be stored in an ROM 16 of an MFP or a nonvolatile memory 18, or may be supplied to a PC as, for example, information held by a printer driver. The formats of aging information and elapsed time correction amount information can be conversion tables, or may be coefficients of matrix operations or conversion coefficients of a lightness or saturation.

Modification of Embodiments

The above-described embodiments have described correction of a scanned image when the original color of an original image is significantly different from that of an image read from a print image due to fading or the like. However, using position-color information, it is possible to perform faithful copy without the influence of metamerism. More specifically, when position-color information is added to a print image to be copied, the copy image can be corrected to a desirable color.

When a scanned image acquired in step S404 shown in FIG. 10 is converted using a scanner profile corresponding to a reading unit 14, data (xn,yn,Ln',an',bn') corresponding to a position can be acquired. When the type of the read image of the original the document is different from that of the image of the original document assumed upon generation of the scanner profile, (Ln',an',bn') becomes a color different from that acquired when viewing the image of the original document, which is not preferable. In other words, it is preferable to be able to acquire (Ln,an,bn) indicated by position-color information (xn,yn,Ln,an,bn). For this purpose, a correction coefficient f for converting (Ln',an',bn') into (Ln,an,bn) is calculated in the same manner as in the first embodiment. When a scanned image is corrected using the correction coefficient f, an image having a desirable color can be acquired.

Fifth Embodiment

The color processing of the fifth embodiment according to the present invention will now be described. Note that the same components as in the first to fourth embodiments are denoted by the same reference numerals in the fifth embodiment, and a detailed description thereof will not be repeated.

The fifth embodiment will describe a process for reducing image deterioration caused by repeated copying, by using position-color information.

Figure 18:
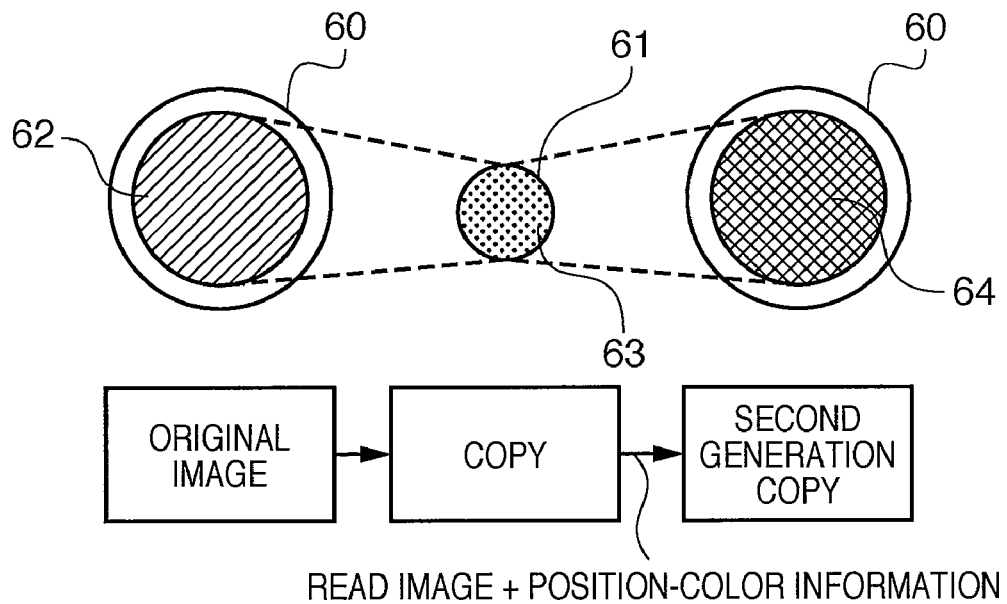
FIG. 18 is a view schematically illustrating change of a color gamut.

FIG. 18 is a view schematically illustrating the change of a color gamut. More specifically, there is a print image (original image) printed on a printing medium with a wide reproducible color gamut 60 such as a photograph printing sheet. This print image is copied onto a printing medium with a narrow reproducible color gamut 61 such as a plain paper sheet, and then that copy is copied onto a photograph printing sheet. FIG. 18 schematically illustrates change of a color gamut in this case.

Assume that a color gamut 62 of the print image falls within the color gamut 60 but wider than the color gamut 61. In this case, when copying the print image onto the plain paper sheet, gamut mapping is performed such that the color gamut of the image is compressed into the color gamut 61 or a narrower color gamut 63. That is, due to gamut mapping, the copy image is recognized as a degraded image in which a contrast or saturation has deteriorated as compared to the print image.

In the fifth embodiment, position-color information for reproducing a print image is added to a copy image upon copying the print image. Note that as the position-color information, information added to the print image can be used, or the position-color information may be extracted from a read mage when copying the image.

When creating a second generation copy copied from a copy image, a scanned image is correction using the position-color information added to the copy image. As a result, the image of second generation copy has a wide color gamut 64 again, so that an image close to the print image with a high saturation and high contrast can be acquired. Note that the color gamut 64 has almost the same area as the color gamut 60 of the print image.

When second generation copy via a plain paper sheet is performed, the color gamut of an image remains narrow even if a photograph printing sheet that can reproduce a wide color gamut is used. However, according to the fifth embodiment, since a scanned image is corrected using position-color information, a high-quality image suited to a printing medium can be acquired even in second generation copy.

Sixth Embodiment

The color processing of the sixth embodiment according to the present invention will now be described. Note that the same components as in the first to fifth embodiments are denoted by the same reference numerals in the sixth embodiment, and a detailed description thereof will not be repeated.

The above-described embodiments have described a method of reproducing the colors of an original print image. The sixth embodiment will describe a method of reducing color heterogeneity that occurs upon printing an original print image or scanning a print image, by using position-color information. Note that the sixth embodiment uses position-color information which indicates the same color at a plurality of positions.

FIGS. 19A and 19B are views showing an original image and a read image (scanned image) of a print image acquired by printing the original image, respectively, in each of which the image is segmented into regions A and B and a selection point is set in each region.

First, the original image is segmented into the two regions A and B, and pixels a and b that have the same RGB values are selected from the respective regions. Then, the position-color information $(xa,ya,Ra,Ga,Ba)$ of the pixel a and the position-color information $(xb,yb,Rb,Gb,Bb)$ of the pixel b are extracted and added to an original print image. Note that since the pixels a and b have the same RGB values, $(Ra,Ga,Ba)=(Rb,Gb,Bb)$ holds.

Naturally, since the pixels a and b have the same pixel value, the pixels a and b should be the same color in both the original print image acquired by printing the original image and the scanned image acquired by reading the original print image. However, color heterogeneity occurs due to the mechanical error of a printer used to print the original print image or the overlaying order of ink colors, or due to a reading device. As a result, the RGB values of the pixels a and b in a scanned image often become $(Ra',Ga',Ba') \neq (Rb',Gb',Bb')$.

To solve this problem, correction coefficients fa and fb are calculated by:

$$(Ra,Ga,Ba)=fa(Ra',Ga',Ba')$$

$$(Rb,Gb,Bb)=fb(Rb',Gb',Bb') \quad (5)$$

where $(Ra,Ga,Ba)=(Rb,Gb,Bb)$

The correction coefficient fa is applied to the region A of the scanned image and the correction coefficient fb is applied to the identical region B to acquire a corrected image of the scanned image. With this operation, since a correction coefficient f is calculated for each region and a scanned image is corrected for each region, it is possible to correction color heterogeneity which occurs upon printing or reading an image.

The above embodiment has exemplified a case in which an image is segmented into two regions. However, the number of segmented regions is not particularly limited, and any number can be used. When the number of segmented regions increases, correction coefficients for color heterogeneity corresponding to the respective regions can be set with a higher accuracy. Accordingly, color heterogeneity can be reduced more effectively.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-252376, filed Sep. 27, 2007, which is hereby incorporated by reference herein in its entirety.

What is claimed is:

1. A color processing apparatus comprising:
a reader, arranged to read an image of an original document to which position information and pixel values of a plurality of pixels in an image used to print the original document are added using a digital watermark technique;
an extractor, arranged to extract the position information and the pixel values from the image read by the reader;
an acquisition section, arranged to acquire pixel values of a plurality of positions indicated by the position information in the image read by the reader; and
a corrector, arranged to correct color of the image read by the reader, using the pixel values extracted by the extractor and the pixel values acquired by the acquisition section.

2. The apparatus according to claim 1, further comprising a print section arranged to print an image corrected by the corrector.

3. The apparatus according to claim 1, further comprising:
an estimation section, arranged to estimate an time elapsed after formation of the original image, based on the pixel values extracted by the extractor and the pixel values acquired by the acquisition section by looking up aging information of a color of a color material; and
a determiner, arranged to determine a correction amount of the image read by the reader from the estimated elapsed time by looking up elapsed time correction amount information, wherein the corrector corrects the color of the image read by the reader based on the determined correction amount.

4. A color processing method comprising the steps of:

reading an image of an original document to which position information and pixel values of a plurality of pixels in an image used to print the original document are added using a digital watermark technique;

extracting the position information and the pixel values from the image read in the reading step;

acquiring pixel values of a plurality of positions indicated by the position information in the image read in the reading step; and correcting color of the image read in the reading step using the pixel values extracted in the extracting step and the pixel values acquired in the acquiring step.

5. A non-transitory computer-readable medium storing a computer-executable program for causing a computer to perform a color processing method in accordance with claim 4.

* * * * *